United States Patent Office 2,977,259
Patented Mar. 28, 1961

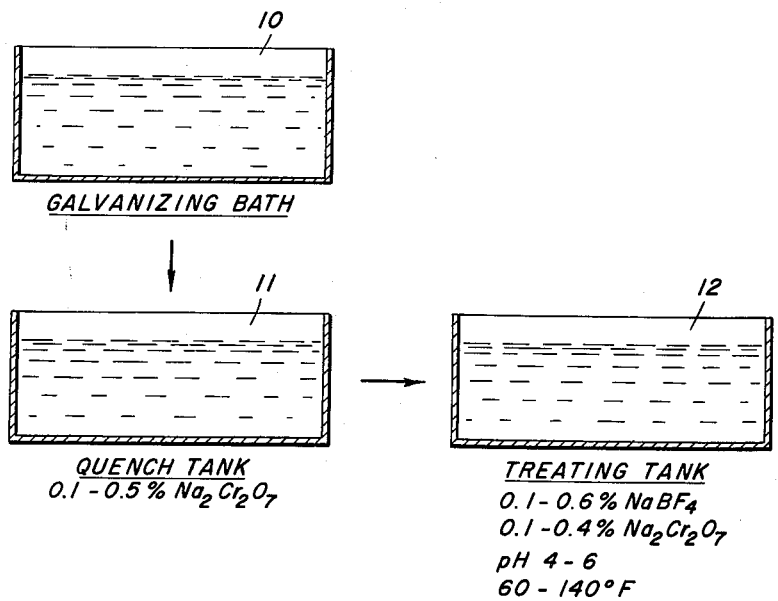

2,977,259

METHOD OF INHIBITING WHITE RUST ON ZINC SURFACES

Ludwig E. Schmelzer, Trenton, N.J., assignor to United States Steel Corporation, a corporation of New Jersey Filed Aug. 18, 1959, Ser. No. 834,549

2 Claims. (Cl. 148—6.2)

This invention relates to the protection of zinc surfaces from the formation of white rust and, in particular, to a method of treating zinc surfaces which will impart lasting protection without impairing the normal appearance of the articles to which it is applied.

It is known from Chappell et al. Patent 1,837,112 that dipping galvanized articles such as lengths of pipe into a dichromate solution affords protection against white rust. Such treatment, however, leaves the product with a yellow or brown stain which mars its appearance. Chester Patent 2,727,841 discloses the result of attempts to overcome this problem. The teachings of this patent, however, proved inapplicable to certain products as galvanized pipe because the treatment described visibly etched the surface and impaired its brightness. It is accordingly the object of my invention to provide a process which inhibits white rust and avoids the coloration resulting from the dichromate dip, yet is applicable to pipe-production lines, without etching the product or altering its normal brightness after galvanizing.

I have discovered a simple yet effective process for treating zinc-surfaced articles, which affords good protection against white rust and does not produce any objectionable side effects, leaving the appearance of the product unchanged. In a preferred practice, I deliver lengths of galvanized pipe, for example, from a hot-dip coating bath of molten spelter into a quench tank containing a weak water solution of a dichromate, i.e., 0.1 to 0.5% sodium dichromate by weight. This solution causes a distinct yellow coloration of the product. After a few minutes (from 1 to 4) in the quench tank, the pipe lengths are next dipped in a water solution containing from 0.1 to 0.6% of sodium fluoborate and from 0.1 to 0.4% sodium dichromate, both by weight, and having a pH value from 4 to 6, for about 2 minutes. This removes the yellow coloration and leaves the product with its bright or originally galvanized appearance.

A complete understanding of the invention may be obtained from the following detailed description and explanation which refer to the accompanying drawing, the single figure of which is a flow sheet showing the method diagrammatically.

Referring now in detail to the drawing, pipe lengths are delivered successively from a hot-dip galvanizing bath 10. The lengths are transferred immediately to quench tank 11 containing a very dilute water solution of a dichromate such as sodium, potassium or ammonium dichromate. This solution contains only from 0.1 to 0.5% of the salt by weight, preferably about 0.3%. The heat absorbed by the solution in cooling the lengths may raise the solution temperature nearly to the boiling point in continuous operation. After from 1 to 4 minutes, preferably about 2 minutes, in tank 11, the lengths are removed therefrom and placed in a treating tank 12. Tank 12 contains a water solution of hydrofluoboric acid or a salt thereof and a dichromate. Its acidity is adjusted to a pH of from 4 to 6, preferably about 5. The fluoborate may be the sodium or potassium salt. The concentration thereof is from 0.1 to 0.6% by weight, preferably about 0.3%. The concentration of dichromate is from 0.1 to 0.4%, preferably about 0.2% by weight. This mixed solution clears up the coloration imparted by the quench in a time interval permissible in line production, and leaves the product with its freshly galvanized appearance. The temperature of the solution is preferably controlled between 60 and 140° F. A higher temperature of the solution in tank 12 will cause some of the yellow coloring to remain on the product. A good operating value is 90° F. Immersion time in tank 12 is kept to within 2 minutes. A time shorter than 1 minute fails to effect removal of the yellow coloration. On removal of the lengths from tank 12, for the desired finishing operations and storage, they will be found uncolored and characterized by a high resistance to the formation of white rust.

The stated range of pH for the treating solution is important. If it exceeds 6, a pale yellow cast may be left on the product. If it is below 4, the etching action of the fluoborate is objectionable. The pH is adjusted initially with sodium hydroxide whether the salt, sodium fluoborate, is added as such to water or fluoboric acid is used in conjunction with sodium hydroxide to form sodium fluoborate in water solution. If the pH should inadvertently go above 5.0 by excess addition of sodium hydroxide, fluoboric acid is added to reduce the pH to the desired value. The dichromate is added after the desired pH has been attained. A concentration of fluoborate exceeding the stated range leads to a salt formation on the surface of the pipe.

As evidence of the effectiveness of my method, product treated thereby, after immersion in distilled water up to 60 hours, showed little evidence of the severe white-rust formation noted in an untreated specimen similarly tested.

It will be apparent that the invention is simple, inexpensive and readily adapted to existing production lines for galvanized pipe.

Although I have disclosed herein the preferred practice and embodiment of my invention, I intend to cover as well any change or modification therein which may be made without departing from the spirit and scope of the invention.

I claim:

1. A method of treating galvanized articles to inhibit white rust formation, which comprises immersing the articles in a dilute water solution containing from 0.1 to 0.5% of a dichromate selected from the group consisting of sodium, potassium or ammonium dichromate and then in a dilute water solution containing from 0.1 to 0.6% of a fluoborate selected from the group consisting of sodium and potassium fluoborates, and from 0.1 to 0.4% of one of said dichromates, said last-mentioned solution having a pH of from 4 to 6.

2. A method as defined in claim 1, characterized by maintaining the temperature of said second-mentioned solution between 60 and 140° F.

References Cited in the file of this patent

UNITED STATES PATENTS

| | | |
|---|---|---|
| 2,507,956 | Bruno et al. | May 16, 1950 |
| 2,610,133 | Thomson | Sept. 9, 1952 |
| 2,727,841 | Chester | Dec. 20, 1955 |
| 2,784,122 | Cox et al. | Mar. 5, 1957 |